United States Patent
Graham

[11] 4,125,808
[45] Nov. 14, 1978

[54] AUTOMATIC SEQUENTIAL SEARCH FOR A RADIO RELAY NETWORK

[75] Inventor: Lawrence H. Graham, Red Bank, N.J.

[73] Assignee: Martin Marietta Corporation, Orlando, Fla.

[21] Appl. No.: 460,316

[22] Filed: Jun. 1, 1965

[51] Int. Cl.² .......................... H04B 7/00; H04B 7/14
[52] U.S. Cl. .......................................... 325/55; 325/4; 325/64; 179/2 EB; 179/18 EA; 179/18 F
[58] Field of Search .............. 179/18.21, 18.3, 18.3 C, 179/18 EA, 18 F, 18 FC, 2 EB, 15; 325/2, 3, 4, 5, 55, 64, 51; 343/177, 178, 203, 204

[56] References Cited
U.S. PATENT DOCUMENTS

| | | | |
|---|---|---|---|
| 2,649,540 | 8/1953 | Homrighous | 325/55 |
| 3,035,169 | 5/1962 | Griffith | 325/3 |
| 3,111,559 | 11/1963 | Jacobaeus | 179/18.21 |
| 3,118,018 | 1/1964 | Cornell et al. | 179/2 EB |
| 3,303,288 | 2/1967 | Wirsing | 179/18.21 |
| 3,328,534 | 6/1967 | Murphy | 179/18.21 |
| 3,377,431 | 4/1968 | Wright et al. | 179/18 EA |
| 3,394,231 | 7/1968 | Hopper et al. | 179/18 EA |
| 3,483,331 | 12/1969 | Hasser | 179/18 EA |
| 3,671,865 | 6/1972 | Szumila et al. | 343/178 |

*Primary Examiner*—Howard A. Birmiel
*Attorney, Agent, or Firm*—Julian C. Renfro; Gay Chin

[57] ABSTRACT

This invention involves the implementation of a mobile, automatic range extension network for a communication system, such as may be used by a field army. Range extension techniques related to this invention are those necessary for the acceptance and routing of calls within the system, with the placement of such calls being accomplished in accordance with a novel automatic sequential search technique. The routing information required for conducting this search is derived from normal equipment operation, and significantly, range extension calls are placed without the aid of area codes. Automaticity of operation permits the range extension equipment to adapt to its geographical environment, and automatically up-dates its routing information to take into consideration physical changes, thus permitting frequent movements of centrals to take place within the telephone system without disrupting communications.

39 Claims, 5 Drawing Figures

AUTOMATIC SEQUENTIAL SEARCH FOR A RADIO RELAY NETWORK

This invention relates to an automatic sequential search technique for a radio relay network within a given communications system, wherein the sequential search technique permits a calling basic communication user within the system to establish communications with any one of a large number of widely separated called parties without the aid of special routing prefixes preceding the number of the desired party.

The present invention finds particular utility in a communications system of the type disclosed in copending application Ser. No. 540,706 filed Apr. 6, 1966, entitled "Radio Telephone System Having Automatic Channel Selection," which application is directed to a military radio-telephone communications system; however, the techniques disclosed herein may find wide utility in the communication field in general.

A system such as disclosed in the aforementioned application, is intended to replace "switched" communication systems presently in use by various military organizations. It is characterized by high mobility, flexibility, and fast set-up time, and is capable of providing high quality service to a large number of highly mobile communicating units without excessive band-width requirements.

As described in detail in application Ser. No. 540,706, as well as in the earlier application of Mills et al, Ser. No. 463,304, filed June 11, 1965 supervision and control are exercised on what is described as a "co-channel" basis, while actual communication is on an "adaptive-exclusive" basis. With respect to co-channel control, reference is made to asignee's copending application Ser. No. 107,194, filed May 2, 1961, entitled "Discrete Address Communications System With Random Access Capabilities," now U.S. Pat. No. 3,239,761, wherein is discussed the concept of time-frequency coding as a means of identification and message transmission.

Briefly, the concept of time-frequency coding involves the simultaneous use of a number of carrier frequencies and the arrangement thereof to convey information. In contrast, if a number of frequencies are to be used simultaneously, to identify the intended recipient of a message, then the selection of three frequencies of a large number of available frequencies might be used to determine the recipient of a message. On the other hand, the time-frequency technique involves the selection not only of the frequencies but of the order in which they are presented. Any suitable technique may be used to encode the information; for example, pulse-amplitude or pulse-position modulation may be used. Assuming the use of pulse-position modulation, the information will be presented by the position of three successive pulses, one at each frequency, in an order determined according to the desired recipient of the message.

The concept of adaptive-exclusive channel assignment is based upon the provision of a large number of channels for all users, a particular channel being assigned on the basis of the availability at the moment at which a user desires to communicate. Once a channel is assigned to a particular user, it remains available to him for the entire period of his call and may then be reassigned to the next user desiring the services of a free channel.

Application of these concepts to the present invention results in a system wherein all supervisory information such as the addresses of the calling and called party, priority designations, switching commands, and so forth, are provided on the basis of the presence or absence of pulses in designated time slots of a number of carrier frequencies, while actual communication of messages (either voice or data) takes place over a channel which happens to be available at the time communication of the message is to begin. The adaptive-exclusive communication channel may be a narrow-band, all-pulse, single-frequency channel for transmitting and receiving messages in a duplex manner. The digital format of the message may be of any suitable type; for example, pulse-code modulation, pulse-position modulation, pulse-amplitude modulation, and so forth. It should be understood, however, that the adaptive-exclusive message channel may be of a non-pulse, narrow band variety, such as frequency modulation, amplitude modulation, single side band, or the like. For a pulse system, channels are narrow band (60 kc., approximately) and, consequently, wide pulse (25 to 30 microseconds). The pulses are made wide in order to render effects of multi-path insignificant and, at the same time, to reduce band width.

The system comprises a large number of highly mobile basic communication units, each having direct access to a small number of nearby basic communication units, contact with the remaining basic communication units in the system being accomplished by a group of retransmission units which are in reality central offices serving those basic communication units which happen to be in the vicinity at a given time.

The system, in operation, is very similar to a conventional telephone system, in that, by merely dialing an address, a communication path to any basic communication unit within the area of the caller may be established. The system provides all the capabilities of prior switched systems, as well as additional features not previously available, with accompanying decrease in complexity of operation. Each basic communication unit is capable of determining the availability of message channels in its particular area and selecting one of them for subsequent communication purposes. Selection is based on signal and noise analysis; i.e., a channel having a noise or signal level below a certain predetermined value is considered to be available. The channel selected is used for communication to an intended caller or for communication with a called user. If the channel becomes occupied prior to use by the basic communication unit, another available channel is selected. As indicated, the signaling and calling functions are performed using F-T (frequency-time) co-channel addressing techniques and pulse-position modulation (within an established time slot) to signify various instructions; i.e., channel assignment information, ring, busy, etc.

For interconnection of users through the retransmission network, adaptive channels techniques are employed. Here, exclusive channels for local to retransmission unit connections and inter-retransmission unit connections are provided. Channel allocations for local service are common to all retransmission units and their usage is for communication between a basic communication unit and a retransmission unit. Assignment of these channels is made by the retransmission unit on the basis of availability at the time of need. In addition to the area service channels, a number of exclusive channels are provided for interconnection between retransmission units. Utilization of these channels throughout the network is also on an adaptive basis. Selection of the channel to be used is an automatic process.

Interconnection between the various retransmission units may be made directly through a communication channel, or on a relay basis, where a particular retransmission unit serves to interconnect two other retransmission units. Such an arrangement is quite practical where the network may be extensive and the users very mobile.

Tactical requirements further impose upon the system the burden of adapting to rapid changes in the network configuration. For example, the retransmission units themselves are mobile, and moving a retransmission unit from one site to another could result in a different interconnection pattern for the new location, which patterns must be learned before the retransmission unit can operate. Similarly, the system must be rapidly apprised of the installation of a new retransmission unit, so that calls may be placed to and through it. Finally, the system must be made aware of the removal of a retransmission unit, either intentionally or because of its failure to operate, so that further calls may not be directed to such a retransmission unit until it is again operational.

Thus the tactical communication system is required to adapt itself to a variety of possible system configurations rapidly and with as little human effort as possible, while providing, at the same time, an automatic search program by which a called party, permanently identified by a unique frequency-time address, may be found anywhere in the system.

One search technique proposed heretofore involves a simultaneous search of all adjacent exchanges to locate the desired party. Such a system, however, requires a large number of channels if several calls are to be placed simultaneously. Further, since several exchanges may be processing the same call simultaneously, the possibility of interference is greatly increased. In addition, previous systems do not have the facility whereby a newly installed retransmission unit may rapidly and automatically learn the network configuration, and where the entire system is kept up-to-date as to additions or subtractions thereto.

It is therefore an object of this invention to provide a novel system for the interconnection of users in a communications system.

It is a further object of the present invention to provide an automatic search technique which permits calling within a communication network without the aid of special routing prefixes preceding the number of the desired party.

It is further an object of the present invention to provide a radio communication system in which two modes of service are available; namely, direct communication capability between one basic communication unit and a second basic communication unit, and, secondly, communication between the first basic communication unit and a third basic communication unit via a rangeextension network.

It is a further object of the present invention to provide a communication system having basic communication units and retransmission units in which routing through the system is accomplished sequentially.

It is a further object of the present invention to provide a communications system of the above-described type which is capable of handling a large number of calls while utilizing the radio-frequency spectrum in an efficient manner.

It is a further object of the present invention to provide a communication network for a large number of mobile simultaneous users which is automatically adaptable to variations in network configuration.

It is a further object of the present invention to provide a communications system having basic communication units and retransmission units which automatically adapts itself to the addition or removal of retransmission units from the system.

It is a further object of the present invention to provide a communications system having basic communication units and retransmission units in which the potential for interference between simultaneous calls is greatly reduced.

The present invention attains the above-mentioned objects by the provision of a communication network structure comprising a number of retransmission units. An automatic sequential-search technique is provided for automatically routing calls through the network. Equipment at each retransmission unit provides the capability of relaying calls to other retransmission units and serves as a terminal point for calls from local basic communication units or from the network of retransmission units. Upon the entry of a new retransmission unit into the system, signals are sent by the entrant identifying itself and requesting the identity and means of access to all nearby retransmission units already in the system. The various components of the system store the information sent by the new entrant, while the new entrant stores all information received in reply to its inquiries. Upon the removal of a retransmission unit, the remainder of the system is notified automatically. Thus the entire system is kept up-to-date as to its configuration.

The exact nature of this invention, as well as other objects and advantages thereof, will be apparent from consideration of the following specification and claims relating to the annexed drawings in which:

Figure 1:
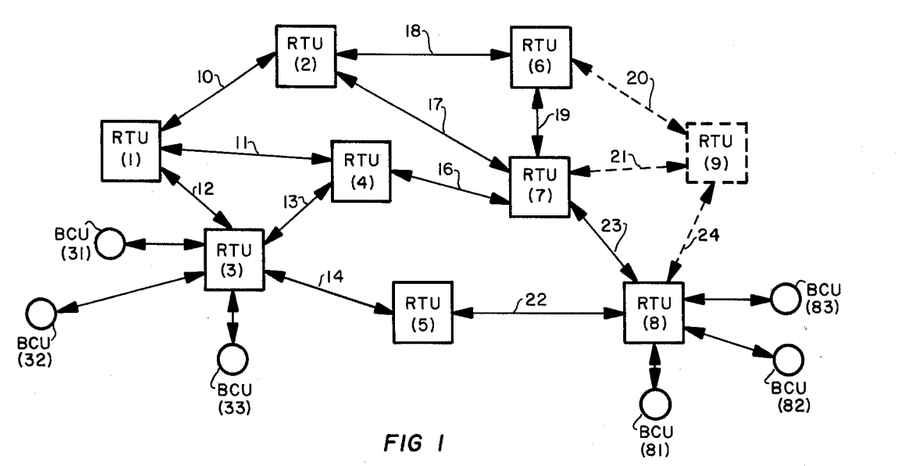
FIG. 1 is a diagram of the communication network showing the basic communication units and the retransmission units.

Referring now to FIG. 1, a typical configuration for a network of the type under consideration is shown. In a preferred embodiment, FIG. 1 represents a radio-telephone network in which the circles represent some of the many basic communication units such as might be available to the various users in a military organization, the blocks represent the retransmission units or switching centers, and the two-headed arrows represent the communication and supervisory channels. Of course, the present concepts are applicable to communication systems of other types, and the communication channel may be of the wire or radio type, utilizing time-division techniques or the frequency techniques as disclosed herein. In the present embodiment, however, at a given time, the system may comprise eight retransmission units RTU(1)-RTU(8), each serving various basic communication units such as BCU(31)-BCU(33), associated with retransmission unit RTU(3), and BCU(81)-BCU(83), associated with RTU(8). Retransmission unit RTU(a) (shown dotted) may represent a new retransmission unit added to the system, to which the system must adapt, or, alternatively, may signify a retransmission unit removed from the system, for which other adaptations of the system must occur. As shown by arrows 10-24, various retransmission units may communicate directly with others, while some connections must be made through one or more intermediate units. For example, retransmission unit RTU(1) may communicate directly with retransmission unit RTU(4) but must communicate through retransmission units RTU(2) and RTU(7) with retransmission unit RTU(8).

Figure 2:
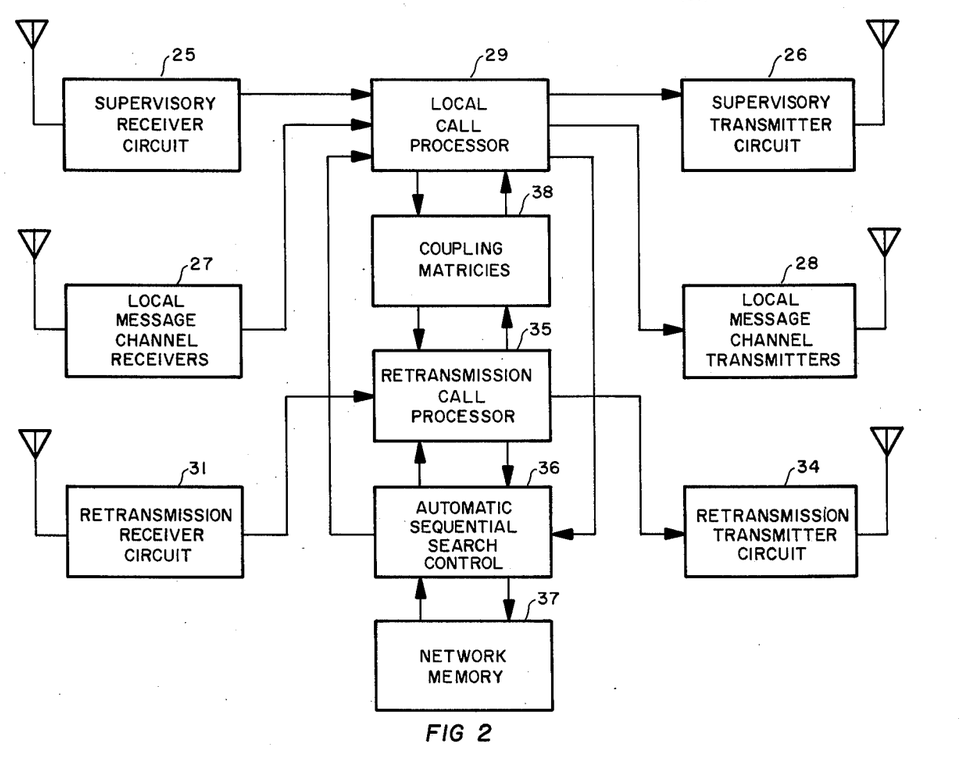
FIG. 2 is a general block diagram of one of the retransmission units.

FIG. 2 shows, in schematic form, the basic components which comprise each retransmission unit. Each unit comprises a supervisory receiver circuit 25 to receive and process service requests from local basic communication units. Similarly, there is provided a supervisory transmitter circuit 26 to return to the basic communication units information such as channel availability and assignment. In addition, circuit 26 is used to interrogate the local area for a called basic communication unit. The number of actual transmitters and receivers contained in units 25 and 26 is determined according to the expected message-handling requirements of the system.

Local message channel receivers 27 and transmitters 28 provide means to receive and transmit the actual messages between the retransmission unit and the basic communication units, and to provide a means for receiving call addresses from the local users.

The entire process is controlled by local call processor 29 connected to units 25-28, which serve as the controller both for local area calls originating and terminating at a given retransmission unit. It contains the necessary logic for accepting calls on the supervisory address, selecting a message channel and assigning the channel to a user requesting service. Upon completion of the assignment function, processor 29 monitors the assigned message channel for call instructions. Also, the processor decodes call instruction information and performs the local searches for a requested basic communication unit. To perform this search, the processor sends appropriate commands to supervisory transmitter circuit 26 for setting in the address of the called basic communication unit. Failure to contact the desired basic communication unit will cause the initiation of an automatic sequential search of other retransmission units.

Retransmission receiver circuit 31 and transmitter circuit 34, operating in preassigned frequency bands, provide message and supervisory links between the various retransmission units. The number of bands so assigned is determined according to the message-handling requirements of the system, and the receivers and transmitters are so arranged that none of the receivers is assigned to a frequency that is being transmitted by any of the transmitters, thereby maintaining the uniqueness of the links shown in FIG. 1.

Retransmission call processor 35 is the control unit for communication between the retransmission units, and functions in the same manner as local call processor 29. Connected to processors 29 and 35 is the automatic sequential-search control unit 36. Upon command by either processor 29 or 35, unit 36 extracts address and channel assignment information from an associated network memory 37 and commands retransmission processor 35 to place calls in a sequential manner to surrounding retransmission units. Control over a given call is maintained by unit 35 in the originating retransmission unit. The search sequence consists of calling surrounding retransmission units and instructing them to search for a particular basic communication unit. Failure to reach the desired basic communication unit through a first retransmission unit results in the search being carried on to other retransmission units. This procedure is continued until all the retransmission units have been contacted and have performed a local search.

Cross-coupling matrices 38 under the control of processors 29 and 35, provide for interconnection of channels for local call handling and for calls originating and terminating at that particular retransmission unit.

Figure 3A:
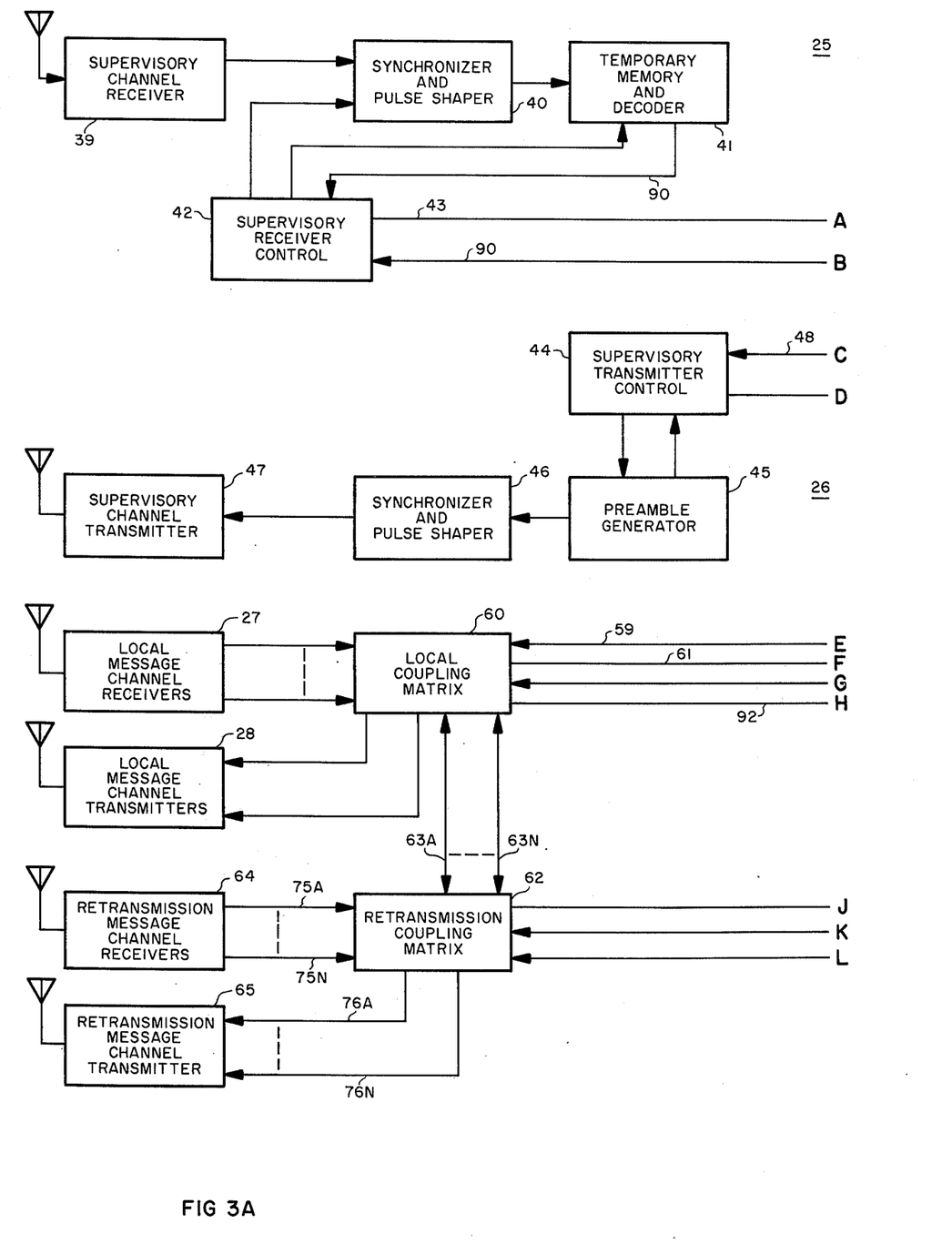
FIGS. 3A-3C, are a detailed block diagram of the retransmission unit shown in FIG. 2.
Figure 3B:
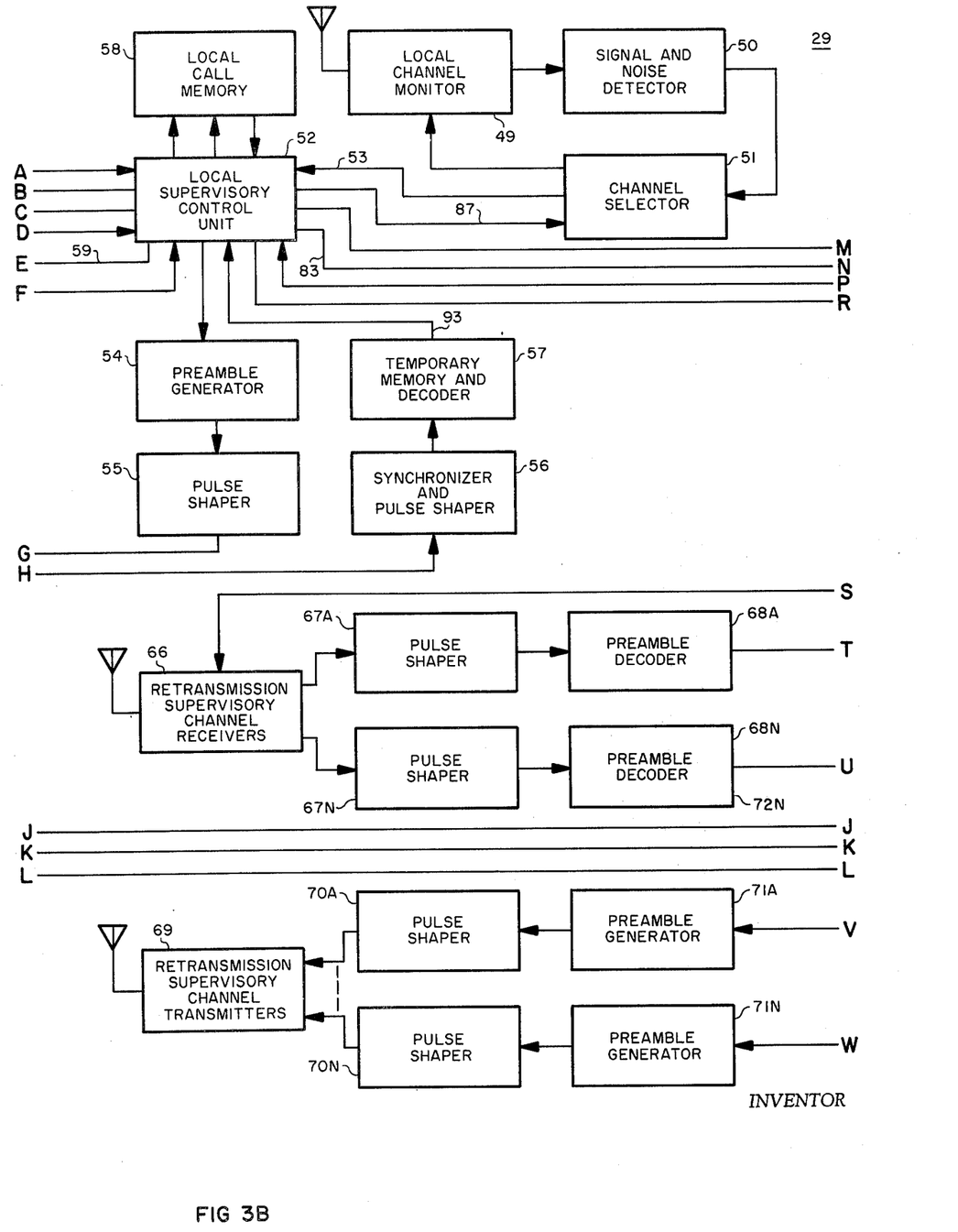
Figure 3C:
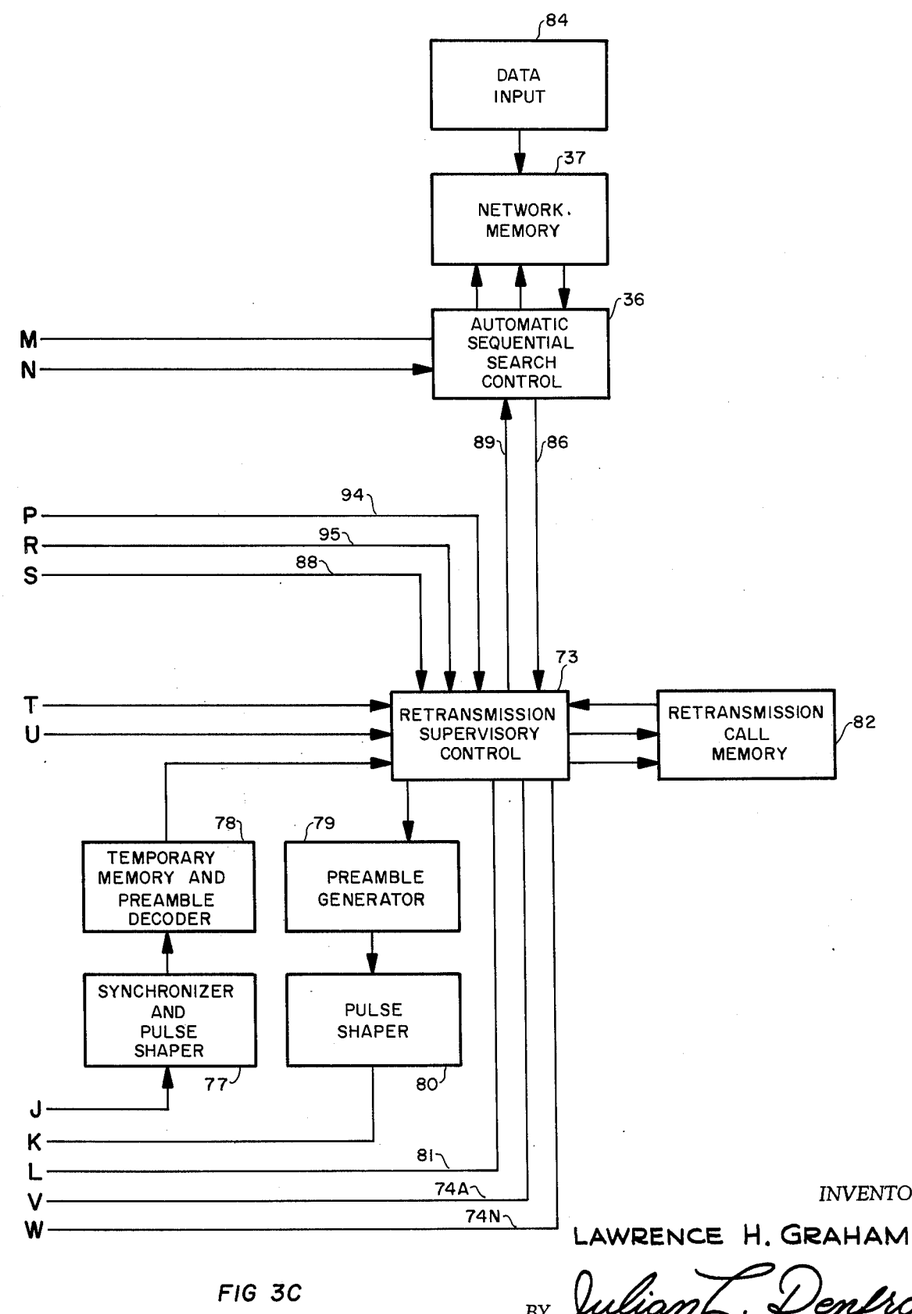

FIGS. 3A through 3C show the details of the retransmission units shown in FIG. 2.

Supervisory receiver circuit 25 of FIG. 2 comprises a supervisory channel receiver 39, synchronizing and pulse-shaping equipment 40, a temporary memory and decoder 41, and a supervisory receiver control unit 42. Supervisory channel receiver 39 is set to a predetermined frequency-time combination and provides for demodulation, etc. of requests from local basic communication units requesting the services of the retransmission unit. The output of the supervisory channel receiver 39 is connected to synchronizing and pulse-shaping unit 40 which, under the control of supervisory receiver control 42, establishes the proper synchronization for the incoming information. Also, unit 40 includes means to regenerate the information pulses to compensate for any degradation which might have occurred in transmission from the basic communication unit.

The synchronized and reshaped pulses are provided to temporary memory and decoder 41 which provides for temporary storage and decoding of the incoming requests to ascertain the type and priority of call, and the addresses of both the calling and the called parties. As previously indicated, the supervisory messages are encoded on a frequency-time matrix, and the exact nature of suitable demodulating and decoding equipment is discussed in detail in the above-noted application Ser. No. 107,194.

Operational control of the supervisory receiver circuit 25 is provided by supervisory receiver control 42. This unit, comprising digital circuitry of well-known construction, receives the decoded information from decoder 41, interprets the information and sends commands to local call processor 29 over lead 43 for calling, type of call, call priority, and addresses of both the calling and called parties. In addition, supervisory receiver control 42 includes logic circuitry to establish synchronization of incoming data by means of synchronizer and pulse-shaper unit 40 and to clear the storage section of the temporary memory and decoder 41.

The supervisory transmitter circuit 26 of FIG. 2, comprises a supervisory transmitter control 44, preamble generator 45, synchronizer and pulse-shaper 46 and supervisory channel transmitter 47. Supervisory transmitter control 44 provides the operational control for unit 26 of FIG. 2. Upon command from the local call processor 29, transmitter control 44 will cause a message or preamble to be generated on the time-frequency matrix address of the basic communication unit for which the message is intended. Information to be included in the preamble is received from the local call processor 29 over lead 48. Supervisory transmitter control 44 controls the preamble generator 45 which establishes the format for information to be encoded on the time-frequency matrix.

The generated preamble is provided to synchronizer and pulse-shaper 46, which provides for the synchronizing and shaping of the pulses to be fed to the supervisory channel transmitter 47. Shaping of the outgoing pulse information is necessary in order to provide control of the R-F spectrum of the outgoing message.

In the above description, receiver 39 and transmitter 47 have been shown as single units. In practice, a number of receivers and transmitters may be provided, depending upon the volume of traffic expected.

Local call processor 29 of FIG. 2 comprises a number of sub-units, as shown in FIG. 3B. Local channel monitor 49 is a special receiver that monitors, in turn, each of the channels assigned for transmission of messages between the transmission unit and the various local basic communication units. A channel selector 51, which may be a stepping switch or any suitable sequential circuit such as a pulsed ring counter, causes monitor 49 to successively monitor each channel in turn, and provides to the local supervisory control unit 52 the address of the channel being monitored at that time. The output of channel monitor 49 is provided to a signal-and noise detector 50 which monitors the output of unit 49 to determine if a particular message channel is being used. If the channel is free from modulation, it is checked for noise level; if the noise level is below a predetermined reference level, the channel is considered as being free. The presence of either noise or modulation in the output of channel monitor 49 will cause a signal to be sent to the channel selector 51 to advance monitor 49 to another channel. The absence of modulation or noise on the channel being monitored will cause a signal to be sent to the selector, stopping its operation. Later detection of modulation or an increase in the noise level on the channel being monitored will cause a signal to be sent to the selector to again advance to another channel. This is a continuous process whereby channel monitor 49 will always be on an available channel, and channel selector 51 will provide local supervisory control 52 the address of this available channel over lead 53.

Local call processor 29 further includes a preamble generator 54 and pulse shaper 55 to generate information to be transmitted by the local message channel transmitters 28, and synchronizer-and-pulse-shaper unit 56, and temporary memory and decoder 57 to receive and decode supervisory information received by local message channel receivers 27. Preamble generator 54 is generally similar in function and construction to preamble generator 45. This unit generates preambles containing supervisory information such as channel assignment, special instructions, and information as to the type of call and the priority. Pulse shaper 55 is of the same construction and serves the same function as pulse shaper 46, causing the outgoing information to be transmitted in suitably shaped pulses having the desired spectrum characteristics. Synchronizer-and-pulse-shaper 56 is similar to unit 40, and provides for the synchronizing and reshaping of the supervisory information as previously described. The received message, after processing by synchronizer-and-pulse-shaper 40, is provided to temporary memory and preamble decoder 57, which serves in the same way as unit 41 to temporarily store and decode the incoming messages for use by local processor 29.

The local supervisory control unit 52 provides local control of incoming calls from basic communication units, and of calls from other retransmission units intended for termination at the particular retransmission unit. Unit 52 receives information from supervisory receiver control unit 42 over lead 43, interprets instructions contained in received preambles, and causes appropriate commands to be generated. In conjunction with a local call memory 58 and selector 51, signals are sent over lead 59 whereby one of receivers 27 and transmitters 28 are caused to be interconnected by local coupling matrix 60 and existing calls are monitored over lead 61 to determine when a channel may be released. Unit 52 further serves to generate instructions for a local search for a desired basic communication unit, and in the event that the desired unit does not respond to the local search, serves to generate a command to initiate a sequential search of all the other retransmission units in the system for the desired basic communication unit.

Connected to the local supervisory control unit 52 is a local call memory 58 which is used by control unit 52 to maintain the status of the calls being processed, and the assignment of channels for the calls. Upon the determination by the local supervisory control unit that a call has been completed, local call memory 58 is signaled to erase the status pertaining to that particular call, thereby releasing the communication channel for further use.

A number of local message channel receivers 27 and local message channel transmitters 28 are provided under the control of local supervisory control unit 52 to provide interconnection between the retransmission unit and the various local basic communication units. The number of receivers and transmitters is determined on the basis of the expected local-call volume, and each receiver and transmitter may be used with any of the assigned local message channels. Under the control of supervisory control unit 52 and local call memory 58, an available receiver and transmitter are adjusted to the frequency of an available channel whereby a local basic communication unit may call another local basic communication unit or may be interconnected with a basic communication unit at a different retransmission unit. Receivers and transmitters 27 and 28 may be of any suitable type, as determined by the particular coding chosen for the transmission of information over the message channels.

Coupling matrices 38 are comprised of a local coupling matrix 60 and a retransmission coupling matrix 62. A plurality of interconnections are provided between the two matrices, the number being determined by the expected volume of calls between retransmission units. Each coupling matrix 60 and 62 contains suitable logic circuitry which, under the command of local supervisory control unit 52 (or the corresponding retransmission supervisory control unit) provides for the desired interconnections. For example, under the control of local supervisory control unit 52, a particular local message channel receiver and local message channel transmitter may be directly interconnected, within local coupling matrix 60, or, by one of leads 63A-63N connected to the retransmission coupling matrix 62 and thence to one of retransmission message channel receivers 64 and retransmission channel transmitters 65. In this way, a call may either be established between two local basic communication units or between one local basic communication unit and a basic communication unit remotely located and under the control of a separate retransmission unit.

Retransmission receiver circuit 31, shown in FIGS. 3A and 3B, comprises a number of supervisory channel receivers 66 and their associated pulse shapers 67A-67N and preamble decoders 68A-68N. Similarly, retransmission transmitter circuits 34 comprise a number of transmitters 69, and associated pulse shapers 70A-70N, and preamble generators 71A-71N. Pulse shapers 70A-70N, preamble decoders 68A-68N, pulse shapers 70A-70N, and preamble generators 71A-71N operate in the manner described above to process incoming and outgoing supervisory information pertaining to interconnection of various retransmission units. The number of retransmission supervisory channel receivers and transmitters is determined by the number of supervisory channels in the system that are necessary for supervisory control between the retransmission units. Each receiver and transmitter may be of any suitable type capable of handling the data format of the inter-retransmission unit's supervisory information. The output of preamble decoders 68A-68N is provided over leads 72A-72N respectively, to a retransmission supervisory control unit 73, which in turn provides, over leads 74A-74N, the information necessary to control the preamble generators 71A-71N.

The actual communication of messages between retransmission units is provided by retransmission message channel receivers 64 and retransmission message channel transmitters 65, connected over leads 75A-75N and 76A-76N, respectively, to the retransmission coupling matrix 62. In addition to handling message communications between retransmission units, this message receiver-transmitter combination is also used to handle supervisory information between interconnected retransmission units. The supervisory information in this case refers to that supervisory information in excess of preamble and channel assignment information. The number of receivers and transmitters necessary is determined by the system's communication requirements, and each receiver and transmitter may be tuned to all of the communication channels within the band assigned to each retransmission unit. The receiver, transmitter, and channel assigned to a particular call is determined by the retransmission supervisory control unit 73. Receivers 64 may be connected through retransmission coupling matrix 62, synchronizer and pulse shaper 77, temporary memory and preamble decoder 78, as described above, to retransmission supervisory control unit 73. Similarly, control of the retransmission message channel transmitters 65 is provided by retransmission supervisory control unit 73 through preamble generator 79, pulse shaper 80, and the retransmission coupling matrix 62, as described above.

The retransmission supervisory control unit 73 functions similarly to local supervisory control unit 52 to control operation of the retransmission unit in the automatic sequential-search mode. It receives information from other retransmission units requesting local searches, and information from calls received during local service operation. It makes necessary channel assignments, selects additional frequency blocks as required, makes necessary interconnections between the receivers and transmitters through retransmission coupling matrix 62, whereby calls arriving from other retransmission units and terminating thereat may be suitably interconnected with the local message transmission and receiving equipment. In addition, under the control of automatic sequential search unit 36, supervisory control unit 73 generates the proper preambles and controls their transmission for carrying on remote searches at other retransmission units. In addition, unit 73 generates control signals which are connected over lead 81 to the retransmission coupling matrix for suitable interconnection of the retransmission receivers 64 and transmitters 65. Associated with retransmission supervisory control unit 73 is a retransmitted call memory 82, similar to local call memory 58, for the storage of information regarding calls being processed, and for the assignment of the various available retransmission channels.

After a local search has been conducted under the control of local supervisory control unit 52, and the desired basic communication unit is found to be unavailable to the retransmission unit, a signal is provided over lead 83 to the automatic sequential search control unit 36, which provides for the control of the automatic sequential search mode. This unit determines the path through the network that a given call will follow, and makes necessary retransmission unit channel and address assignments to conduct the search. In addition, the unit analyzes retransmission unit address information received during normal call processing and ascertains whether that information is already available in its associated network memory 37. If this information, which relates to the present network configuration, is not already available, then meory 37 is updated to provide the automatic sequential search control with up to date information.

Network memory 37, in addition to providing storage of the network configuration information for automatic sequential search unit 36, also provides a temporary storage for information regarding the status of calls being processed in the sequential search mode. A suitable data input unit 84 is provided for the initial insertion into the network memory 37 of some of the basic network configuration information accurate as of the time the retransmission unit is first inserted into the network.

In the following description of the operation of the above-described system, the term "preamble" refers to that information of a supervisory nature, including the address or number of the desired basic communication unit, and the address or number of the calling basic communication unit. All further references to the address or number contained in the preamble will be noted by the term "address."

The operational mode of this system may be best described by subdividing it into the operations of the entry of a new retransmission unit into the system, normal operation, and the removal of a retransmission unit from the system. In each case, all functions performed are automatic and are controlled by internal mechanisms within the system.

Upon the entry of a new retransmission unit into the system, it must undergo a learning process, since only a minimal amount of information is preset into the network memory 37. The nature of this information pertains to the address assignment of the retransmission unit itself and the addresses of the other retransmission units within the system. This information may be preset into the memory 37 by an operator through data input unit 84, by standard digital techniques utilizing a keyboard or similar device. During normal operation, routing information is learned and stored in memory 37. Calls received via supervisory channel receivers 66, are processed by pulse shapers 67A-67N and decoded by preamble decoders 68A-68N. The decoded information is the retransmission unit's own address, the address of the calling retransmission unit, and instructions for call handling. This information is coupled to the retransmission supervisory control 73 and logic tests performed. From these logic tests routing information can be derived. Using this information then as a basis, interconnecting path information can be derived and will be stored in network memory 37. This information will be continually updated and used in the sequential search mode.

Upon the completion of the manual presetting of the address assignments, the automatic process for entry into the system is initiated. Commands for this procedure are generated by the automatic sequential search control unit 36 and are forwarded over leads 85 and 86 to the supervisory control units 52 and 73. The local supervisory control unit 52, upon receipt of this command will apply a signal over lead 87 causing channel selector 51 to step and select a particular channel to be monitored. Monitor 49 will be tuned to this channel to ascertain its availability. The actual selection of the channel is accomplished by the signal and noise detector 50. If the channel being monitored meets the specified requirements for the absence of modulation and nosie, channel selector 51 will be commanded to rest on the particular channel being monitored. The presence of modulation or noise will cause another channel to be monitored. Upon the receipt of the "stop" command by channel selector 51, a signal will be generated and transmitted to local supervisory control unit 52 over lead 53 to enable the unit to read out the identification of the presently monitored channel. This information is retained in local call memory 58 until needed. In the absence of a "stop" signal, the operation of the channel selector is controlled by a timing generator and will continue to step until an available channel is found. In this way, local call memory 58 always contains the address, an available channel for communication between the retransmission unit and a local basic communication unit.

In a like manner, similar tests are performed by unit 73 to determine the availability of channels for communication between retransmission units. However, in this case, a number of continuous channels are selected with one of these channels being reserved as a supervisory channel. The grouping of frequencies which comprise the number of continuous channels, will be referred to as a "band". The actual operation of selecting of a band is an automatic function and is controlled by the retransmission supervisory control unit. Upon a command over lead 87 from control unit 73, one of the retransmission supervisory channel receivers 66 is selected to monitor the supervisory channel of the selected band. The pulse shapers 67 and preamble decoders 68 serve as monitors for the output of the receivers 66. In addition, the primary function of decoders 68 is to continually monitor each of the supervisory channels within the retransmission unit transmit bands to ascertain when an incoming call is for that retransmission unit. As a particular channel is monitored, a test will be performed to determine if the channel is busy. If the channel is busy, a command will be forwarded to the supervisory control unit 73 by the corresponding decoder over one of the leads 72. Upon recepit of the command, the supervisory control unit will select another band for use, and in turn select its associated supervisory receiver to be monitored. The sequential test will be continued until an available band is found. Upon the finding of a band which is available for use, supervisory control unit 73 will inhibit the sequencing process and, by means of one of the preamble decoders 68, will identify the band being monitored. This selected band will be used by the given retransmission unit for the transmission of supervisory and message information to other retransmission units within the retransmission to retransmission unit mode of operation. The address of the band is provided over one of leads 72 to supervisory control 73 and the identification of the available band is stored in the retransmitted call memory 82.

Upon the selection of an available band, the next step involves a determination of which of the surrounding retransmission units may be contacted. First, the subroutine for channel request processing is generated by the supervisory control unit 73. This consists of the selecting from network memory 37 via lead 89 and search control 36 the address of one of the retransmission units contained within the system, the address of the node of the retransmission unit itself, and the code word signifying an interrogation for band availablity. This information is forwarded by unit 73 to the preamble generator 79, which arranges the information in the proper preamble form. The format is such that the address of the called retransmission unit is first, the address of the retransmission unit placing the call is second and the code word signifying interrogation is last. The preamble is then fed to the supervisory channel transmitter 69 of the selected band, preceded by the appropriate synchronization signal. The preamble is then transmitted by a pulse or other appropriate modulation scheme. Since each retransmission unit has a receiver monitoring each of the retransmission to retransmission band supervisory channels, it has the capability of ascertaining when a particular call is for a given retransmission unit. After the interrogation has been transmitted, and a sufficient time to allow for a reply has elapsed, the absence of a reply on any of the supervisory channels being monitored by receivers 66 will cause the address of another retransmission unit to be selected from the network memory 37 and the process to be repeated. The no reply condition indicates that the retransmission unit called is not a neighbor of the calling retransmission unit. Since the supervisory channel receivers 66 is connected to each of the supervisory channel, by the monitoring of each channel it may be ascertained when a reply to the interrogation has been received. An incoming reply will be identified as containing the address of the node making the request in the proper position within the incoming code.

Upon the receipt of a reply, the preamble is demodulated by the supervisory channel receiver and the demodulated signal forwarded to one of the shaping units 67 and preamble decoder units 68. Upon decoding, the address of the replying retransmission unit will be forwarded to the retransmission supervisory control unit 73. Control unit 73 thereby determines that the address interrogated is in fact one of the neighboring nodes, and that that retransmission unit selected replies that the band selected is not in use by it or its surrounding neighbors.

Upon reply to an interrogation, the address interrogated is properly marked in the retransmitted call memory 82 to denote it as being a neighbor, plus the particular band it uses for transmitting. If no reply to any of the interrogations on a particular band is received, then a second retransmission address is selected from memory 82, and the entire process of interrogation of the known retransmission unit addresses contained in memory 82 is repeated.

During this band-selection process, all of the addresses of the retransmission units in the system are interrogated. After each interrogation, the address called is tagged in retransmitted call memory 82 to note that that address represents an accessible neighboring retransmission unit and their band assignments. These band assignments may be changed from time to time, and a continual updating process must be followed. This change results from the adaptive capabilities provided in the selection of these bands. A given retransmission unit may use more than one band at a time to handle its message needs.

Upon the completion of the interrogation on all of the available retransmission addresses, the retransmission unit is ready for operation.

The first step of receiving any call consists of the monitoring of the supervisory channel for local service. Information received on this channel will be in the same preamble format described above. First, it will contain the address of the retransmission unit being called, followed by the address of the calling basic communication unit. The preamble also will include a code designation to denote the type of call.

Upon the receipt of a preamble by supervisory channel receiver 39, the incoming message will be demodulated and the signal forwarded to the synchronizer and pulse shaper 40, which provides for the synchronization and shaping of the incoming data. The information is forwarded to the temporary memory and decoder unit 41, which decodes the information contained in the preamble and signals the superivsory receiver conrol unit 42 of its success over lead 90. Supervisory receiver control unit 42 in turn signals the local call processor 29 of the presence of a call over lead 43. Unit 29, in turn, initiates a subroutine to process this call. First, unit 52 obtains from supervisory receiver control unit 42 the address of the calling basic communication unit and stores this information in the local call memory 58. Upon completion of this step, supervisory receiver control unit 42 is signaled over lead 90 to ready itself for its next call. Next, the available channel identification generated by the channel selector 51 is retrieved from the memory 58 and forwarded to the supervisory transmitter control unit 44 over lead 48 along with the address of the basic communication unit calling and commands the preamble generator 45 over lead 91 to arrange the information in proper preamble format for transmission. Simultaneously, one of the local message channel receivers 27 is assigned to monitor the available channel to be used for the call. Upon completion of the generation of the preamble, it is forwarded through synchronizing and pulse shaping unit 46 to supervisory channel transmitter 47. Transmitter 47, which operates in the co-channel mode described above, forwards the address of the channel assigned for the call to the calling basic communication unit.

Upon receipt of the channel assignment by the basic communication unit requesting service, it will adjust its transmitter to the channel assigned, and transmit to the retransmission unit, the address of the basic communication unit with which it desires a connection. During this time, supervisory control unit 52 will establish by means of lead 59 a connection from the local coupling matrix 60 over lead 92 to synchronizer and pulse shaper 56 and temporary memory and decoder 57 and then await a reply from the basic communication unit on the assigned channel. In this way, the supervisory channels are used for extremely short periods of time, thereby permitting a high call-handling rate.

Upon the receipt of the address of the called basic communication unit over one of the message channel receivers 27, the message passed through matrix 60 is processed by synchronizer and pulse shaper 56 and temporary memory and preamble decoder 57, whereupon the decoded information is provided over lead 93 to the local supervisory control unit.

Upon receipt of this information, supervisory control unit 52 signals the supervisory transmitter control 44 to call the desired basic communication unit. The process used is identical to that process previously described for a reply to a request for service over the supervisory channel. At this time, a command is sent over lead 59 to local coupling matrix 60 to tune and interconnect a transmitter 28 to the message channel assigned for the particular call. If a reply is received from the called basic communication unit, this is an indication of its presence in the local area serviced by the retransmission unit. Upon receipt of this reply, on the assigned channel, supervisory control unit 52 commands the preamble generator 54 to compose a preamble signifying the completion of the call. This preamble is forwarded to pulse shaper 55 and thence, via the local coupling matrix 60 to the selected transmitter. The preamble is then transmitted to both the calling and the called basic communication units, and upon receipt of this message by the two units involved, a communication path has been established for them. This connection is maintained by the local coupling matrix 60 until the completion of the call. Periodic monitoring over lead 61 of the assigned channels under the control of the local call memory 58 provides an indication of the completion of a call, whereupon a command is sent over lead 59 to break the interconnection.

After the transmission by the supervisory channel transmitter 47 of the address of the desired basic communication unit, a sufficient time for reply is allowed, and in the event no such reply is received, the local search is inhibited. At this time, an automatic sequential search of all of the retransmission units in the system is initiated. This sequential search includes the calling of the surrounding retransmission units and requesting that they search locally for the desired basic communication unit. This process is continued until all nodes have been contacted. The process begins by the transmission of a command signal over lead 83 by the local supervisory control unit 52 to the automatic sequential search control unit 36. Sequential search control unit 36 selects from the network memory 37 an address denoting one of the neighboring retransmission units. It then signals retransmission supervisory control unit 73 over lead 86 to initiate a call on the supervisory channel of the band being used for transmission purposes by the particular retransmission unit. Retransmission supervisory control unit 73 obtains this band from memory 82 and accepts the address of the desired basic communication unit from the local supervisory control unit 52. This address is provided to preamble generator 79 and is arranged into preamble form, whereupon it is forwarded to pulse shaping unit 80. The particular preamble transmitted contains the address of the retransmission unit being called, the address of the calling retransmission unit, channel assignment, and the request for a remote search. The called retransmission unit detects the presence of this call by the action of its supervisory channel receiver 66, pulse shaper 67, and preamble detector 68. Detection in this case refers to the identification of its own address appearing upon one of the supervisory channels, plus the address of the retransmission unit making the call. By noting the supervisory channel receiver upon which the call was received, band used by the calling retransmission unit can be ascertained and maintained in network memory 37. Upon receipt of this request, the retransmission unit being called returns a reply, which is received by the one of the supervisory channel receivers 66. A reply from the called retransmission unit contains a channel assignment to be used by the calling retransmission unit for receiving subsequent communications from the called retransmission unit. Retransmission supervisory control unit 73 then sends the appropriate command to the retransmission coupling matrix 62 for the interconnection through lead 93 of one of the receivers 64 to the synchronizer and pulse shaper 77 and the temporary memory and preamble decoder 78, as well as the interconnection of the preamble generator 79 and pulse shaper 80 via lead 94 to one of the transmitters 65. Thus, a channel has now been assigned for transmission to the called retransmission unit, and for receiving a signal back therefrom. Further supervisory functions are carried on via this assigned channel.

At this time the supervisory control unit 73 commands the preamble generator 79 to provide a preamble containing the address of the desired basic communication unit as well as the appropriate call-type designator. The preamble is forwarded to pulse shaper 80, which arranges the preamble into the correct time relationship and inserts the necessary synchronizing pulses for transmission. The encoded preamble is then forwarded to the appropriate transmitter 65 through the retransmission coupling matrix 62. The coding of the preamble signifies that the retransmission unit to which the message is directed is to search locally for the desired basic communication unit. Such local search is identical in nature to the local search performed unsuccessfully before the initiation of the automatic sequential search. Retransmission supervisory control unit 73 awaits a reply from the searching retransmission unit as to the progress of the call. If the call is completed, the interconnection of the appropriate receiver and transmitter through the retransmission coupling network 62 is maintained and unit 36 is notified over lead 89. Sequential search control unit 36 then notifies the local supervisory control unit 52 over lead 85 of the completion of the call, and of the exact nature of the interconnections made within the retransmission coupling matrix 62. Upon receipt of this information, local supervisory control unit 52 causes the coupling of local coupling matrix 60 to the appropriate inputs of retransmission coupling matrix 60 over one of the leads 63. These interconnections are maintained until the call has been completed. Upon completion of the call, the interconnections between the local and retransmission coupling matrices are released. If the desired basic communication unit is not available at the first retransmission unit contacted, a message to this effect will be received by unit 64 whereupon sequential search control unit 36 will command the retransmission control unit 73 to call the next neighboring retransmission unit. The address of this unit is taken from the network memory 37 and forwarded to the supervisory control unit 73. Supervisory control unit 73 then carries out the same procedure described above for the call to the first retransmission unit.

If all attempts to contact the desired basic communication unit at the surrounding nodes result in failure, then the sequential search control unit 36 causes the process of calling the surrounding nodes in sequence to be repeated. However, the preambles transmitted by the supervisory channel transmitter 69 include a command for each of the contacted retransmission units to call its surrounding neighbors, the call, however, remaining under the direct control of the initiating retransmission unit. In the process of the passage of preambles back and forth between the called retransmission unit and its neighbors, the calling retransmission units learn the identity of the retransmission units not directly accessible to it. This is accomplished by the fact that all initial calls are placed via the supervisory channel of a given retransmission-to-retransmission unit transmit band. By this monitoring function, the process of network updating is perpetuated. If the desired basic communication unit is not available at the retransmission unit contacted by the called retransmission unit, then it is requested to contact a second one of its neighbors and request that a similar local search be carried out. If all of the neighbors of the called retransmission units fail to reach the desired basic communication unit, the original retransmission unit is so notified. At this time, the address of a second retransmission unit is selected from the network memory, and the entire process repeated. This process is continued until the desired basic communication unit is contacted or all of the retransmission units have attempted a local search. If no retransmission unit is able to reach the desired basic communication unit, the calling basic communication unit is so notified, and the call is canceled.

Since each step of the process is under the control of the sequential search unit of the initiating basic retransmission unit, it is quite clear that in the normal process of operation, the calling retransmission unit, as well as all the other retransmission units, will be kept up-to-date as to the system configuration.

Calls from surrounding retransmission units are received by one of the supervisory channel receivers 66, one such receiver being provided for each of the bands available for retransmission unit communication. Upon receipt of a call, retransmission supervisory control unit 73 is notified over one of leads 72. Unit 73 then selects an available channel within the band available for communication with the calling retransmission unit. The address of this channel is transmitted over the supervisory channel within this transmitting band. To accomplish this, the supervisory control unit 73 causes a preamble to be generated, as described above, and to be transmitted by means of one of the supervisory retransmission channel transmitters 69. At the same time, an appropriate connection is established through retransmission coupling matrix 62 for the interconnection of one of the retransmission message channel receivers 64 and a retransmission message channel transmitter 65.

The original calling retransmission unit now replies over the one of the retransmission message channels selected. Upon receipt of the reply, the preamble is processed and decoded by units 77 and 78 and the message forwarded to the supervisory control unit 73. Information pertaining to the incoming call is stored in the retransmission call memory 82 and local supervisory control unit 52 is commanded over lead 94 to initiate a local search for the basic communication unit desired. The local search procedure is the same as that previously outlined, both as regards a local search made by the retransmission unit of FIGS. 2 and 3, and a local search made by one of the neighboring retransmission units commanded by the retransmission unit of FIGS. 2 and 3 when in its automatic sequential search mode. Briefly, the local supervisory control unit 52 commands supervisory transmitter control 44 to transmit the address of the desired basic communication unit. An appropriate preamble is generated and processed by units 45 and 46. The preamble is then transmitted on the address of the basic communication unit being called, and one of the local message channel receivers 27 is assigned to monitor an available local channel. A reply from the desired basic communication unit will cause local supervisory control unit 52 to signal the retransmission control unit 73 over lead 95 to establish a communication path via local coupling matrix 60 and retransmission coupling matrix 62. This interconnection is maintained until the call is completed.

If the desired basic communication unit does not reply within a suitable time, retransmission control unit 73 causes a preamble to be generated signifying this failure. This preamble is then transmitted, as previously described, to the calling retransmission unit. The calling retransmission unit will then contact another of its neighboring retransmission units, and further services of the retransmission unit of FIGS. 2 and 3 will cease.

Calls received from other retransmission units for relaying to the neighbors of the called retransmission unit are received in the same manner as those calls from retransmission units requesting a local search. Upon the receipt of a preamble indicating that such service is desired, the retransmission supervisory control unit causes the selection of the address of neighboring retransmission unit from the network memory 37 and places a call to it requesting a local search. In addition to the relaying services provided by the called retransmission unit, another opportunity is provided for maintaining an up-to-date knowledge of system configuration, since all preambles pertaining to a given call by a relaying retransmission unit are being monitored. As a new retransmission unit enters the system, its identity is learned and information pertaining to the path by which it may be reached is received and stored in the system.

In periods of heavy call traffic, all of the channels available in a particular band may be in use, and it will be necessary for a calling retransmission unit to contact a desired retransmission unit which might otherwise be directly accessible, by means of a relay through another one of its neighbors. Since an up-to-date record of the network configuration is available, such relayed calls may be readily accomplished in the manner previously described for other relayed calls.

A retransmission unit may be removed from the system for one of two reasons: either the need no longer exists for that particular retransmission unit, or it becomes disabled because of equipment failure. If the retransmission unit is to be permanently removed from the system, a specified procedure is followed which is automatically accomplished upon initiation by an operator.

Upon the initiation of this procedure, all of the surrounding retransmission units are informed of the impending removal of the given retransmission unit by the transmission over the supervisory channels of a suitable preamble. Upon receipt of such preamble, and the decoding thereof, each of the receiving retransmission units will cancel the address of the calling retransmission unit being removed from its network memory, thereby preventing the placement of calls to the retransmission unit being removed. To safeguard against the possibility of the receipt of new calls by the retransmission unit to be removed, monitoring of the supervisory channels for both local and retransmission functions is disabled. Calls in process at the time a retransmission unit is to be removed are handled until their completion. However, a command is sent over the existing local channels to indicate that service is to be soon discontinued, in order to prevent an indefinite tie-up of "last minute" calls.

Upon completion of the preceding steps, the retransmission unit may be placed in a standby condition. All information contained in the various memories pertaining to system configuration may be retained in the event that the equipment is to be returned to operation at the same location at some later time. However, if power to the system is removed, then the entire contents remaining in the memory pertaining to system configuration is destroyed.

If a particular retransmission unit becomes inoperative due to an equipment failure, this fact is noted by certain subroutines available in the retransmission supervisory control unit 73 within each retransmission unit. Upon failure of a retransmission unit to contact one of the neighboring retransmission units indicated by its network memory 37 to be accessible, the calling retransmission unit initiates a local test to determine the usage of the correct address and supervisory channel. If no errors are found, a call will be repeated for a specified number of times. In the event that no reply is received after the specified number of attempts, the calling retransmission unit will select another of its neighbors in an attempt to bypass the retransmission unit which does not respond. Upon such failure to contact an expectedly available retransmission unit, its identification is removed from the network memory 37 to indicate its unavailability. After repair of the damaged retransmission unit, the previously described learning process will be re-initiated in order that the repaired retransmission unit, as well as its neighbors, may again learn of its addition to the system.

While the process described above appears to involve a large number of steps, it should be recognized that electronic switching techniques may be used throughout, and that the search process is entirely automatic. Accordingly, a typical interconnection may involve only the passage of a few seconds and may also eliminate the need of any operators in the system except for the calling and called parties.

Finally it should be recognized that the basic communication units may be of any suitable type, and may in fact, represent high speed computers, whereby the retransmission units may serve as interconnections in a mobile data processing network.

While the concepts of the present invention have been described with regard to a preferred embodiment thereof, it should be recognized that the invention is not limited by the above description, and that various modifications obvious to one skilled in the art may be made without departing from the spirit and scope of the invention, as set forth in the appended claims.

What is claimed and desired to be secured by United States Letters Patent is:

1. In a system having a number of basic units and a number of retransmission units, each of which has access to at least one other of the retransmission units, the method of establishing a connection between a calling and a called basic unit which comprises: transmitting a service request from the calling basic unit to a first retransmission unit so that said latter unit will initiate a search for the called basic unit, transmitting from the first retransmission unit a local command that the desired basic unit respond if it is in receiving range of the local command, transmitting from the first retransmission unit, in the event that the desired basic unit does not respond, a request to a second one of the retransmission units that a second local search for the desired basic unit be initiated, transmitting from the second retransmission unit a second local command that the desired basic communication respond if it is in receiving distance thereof, establishing, in the event that the desired basic unit responds to the second local command a connection between the calling and the desired basic communication units including both the first and the second retransmission units.

2. The method of claim 1 further including transmitting from the first retransmission unit, in the event that the desired basic unit does not respond to the second local command, a request to every other retransmission unit in succession, that a local command be generated until the desired basic unit responds or until all accessible retransmission units have been exhausted.

3. The method of claim 2 further including establishing a communication path between the calling and the called basic units which includes the first retransmission unit and the retransmission unit successful in receiving a reply from the desired basic unit.

4. The method of claim 2 further including: transmitting from the first retransmission unit, in the event that all retransmission units accessible thereto have been exhausted, a first relay request to one of the accessible retransmission units that it contact one of the retransmission units accessible to it and request a local search for the called basic unit, establishing, upon a response by the called basic unit, a path including the first retransmission unit, the relaying retransmission unit and the retransmission unit making the search to which the called basic unit responded.

5. The method of claim 4 further including, in the event that there is no reply to the local search made by the neighbor of the first relaying unit, a request that another neighbor of the first relaying unit generate a local search and, in the event that there is no response to the local search of the second neighbor, requesting each of the neighbors of the first relaying retransmission unit in succession to initiate local searches until the desired basic unit responds or until all of the neighbors are exhausted.

6. The method of claim 5 further including, in the event that all of the neighbors of the first relaying unit are exhausted without response from the desired basic unit, a request that a second accessible retransmission unit serve as a relay and request that one of its neighbors initiate a local search and, transmitting from the first retransmission unit, in the event that none of the neighbors of the second relaying unit are successful in reaching the desired basic unit, successive requests to each of the other accessible retransmission units, a request that they in turn contact their neighbors requesting the generation of local searches until the desired basic unit responds or until all retransmission units in the system have been exhausted.

7. The method of claim 6 further including, upon response by the desired basic unit, establishing of a connection between the two basic units which includes the first retransmission unit, the relaying retransmission unit and the neighboring retransmission unit of the relaying unit which initiated the local search to which the desired basic unit responded.

8. The method of claim 7 wherein all of the commands and requests include a first message encoded on a frequency-time matrix.

9. The method of claim 8 wherein all of the commands and requests include a second message transmitted on an adaptive-exclusive basis.

10. In a communication system including a number of retransmission units and communication channels therebetween, the method of providing for the discovery by a retransmission unit added to the system of the entire network configuration which comprises: providing the new retransmission unit with the addresses of all other retransmission units and the identity of the channels by which the retransmission units may be reached, selecting an available communication channel by the new retransmission unit, sending an interrogation over the available channel, to the address of one of the existing retransmission units, storing in the new retransmission unit information indicative of the receipt or non-receipt over the available channel of a reply from the retransmission unit whose address was interrogated, transmitting over the available channel an interrogation to the address of each of the remaining retransmission units in turn, storing at the new retransmission unit, information indicative of the receipt or non-receipt of a reply over the available channel from each of the retransmission units interrogated.

11. The method of claim 10 further including selection by the new retransmission unit of a second available channel, transmitting thereover interrogations to the addresses of each of the retransmission units in turn, storing at the new retransmission unit information indicative of the reply or non-reply by each of the retransmission units in the system to the interrogation messages over the second available channel.

12. The method of claim 11 further including selection on the basis of availability each of the remaining communication channels successively, transmitting over each of the available channels, interrogations, one at a time, to the addresses of each of the retransmission units in the system, storing at the new retransmission unit information indicative of the reply or nonreply by each of the retransmission units on each of the successively selected channels, whereby information will be available to the new retransmission unit as to the accessibility of each of the retransmission units in the system over each of the communication channels.

13. The method of claim 12 further including establishing communication on a regular basis between each of the retransmission units, monitoring the communication channels for information indicative of the accessibility of each retransmission unit on the various communication channels, comparing the monitored information with that information stored at the monitoring retransmission unit, amending such stored information to reflect changes in retransmission unit accessibility.

14. A communication system including a number of mobile basic communication units, a number of local communication channels, a number of retransmission units and a number of retransmission communication channels, each basic unit being in communication with one of the retransmission units for range extension purposes, and each retransmission unit having access to at least one other retransmission unit, each retransmission unit comprising: means providing two-way communication between the retransmission unit and its associated basic communication units, despite lack of knowledge as to their geographical positions, means providing two-way communication between the retransmission unit and at least one other retransmission unit, means responsive to a request for service from a calling basic communication unit to the first retransmission unit, which latter unit causes the generation in the second retransmission unit of a signal representing the address of a desired basic communication unit, despite lack of knowledge as to its geographical positions, and control means to establish communication with each accessible retransmission unit in turn and to transmit the address of the desired basic communication unit thereto.

15. A retransmission unit for a communication system including a number of mobile basic communication units, and a number of retransmission units, each basic unit being in two way communication with one of the retransmission units where requiring range extension service, and each retransmission unit having access to at least one other retransmission unit, comprising: means responsive to a request for range extension service from a calling basic communication unit, means to initiate a search for a called user by the generation of a signal representing the address of his basic communication unit; means to conduct a sequential search for such called user without the aid of area code or directional information supplied by the calling user, control means to successively establish communication with each accessible retransmission unit in turn to transmit the address of the desired basic communication unit thereto; and means responsive to the receipt of an address from one of such other retransmission units to transmit a message to the address received.

16. The system of claim 15 where the control means includes means to transmit to each retransmission unit with which communication has been established, a request that it contact in turn each retransmission unit accessible to it and that it relay thereto the address of the desired basic communication unit.

17. A communication system including a number of basic communication units, a number of local communication channels, a number of retransmission units, and a number of retransmission communication channels, each basic unit being in communication with one of the retransmission units and each retransmission unit having access to at least one other retransmission unit, each retransmission unit comprising; means responsive to a request from a calling basic communication unit to generate a signal representing the address of a desired basic communication unit, means to conduct a sequential search for such desired basic communication unit without the aid of area code or directional information supplied by the calling unit, and control means to establish communication with each accessible retransmission unit in turn for transmitting thereto the address of the desired basic communication unit; and means at the called retransmission unit, responsive to the address of the called basic communication unit, to transmit a message to the address of the desired basic communication unit.

18. The system of claim 17 including: memory means to record the configuration of the system in terms of the addresses of all retransmission units and the channels by which access to each retransmission unit may be achieved.

19. A communication system including a number of mobile basic communication units and a number of retransmission units, each basic unit being in communication with one of the retransmission units over a local communication channel, and each retransmission unit having access to at least one other retransmission unit over one of a number of retransmission communication channels, each retransmission unit comprising: control means operative during an orientation procedure to establish communication with each accessible retransmission unit; memory means to adapt to the network configuration of the system in terms of learning the addresses of all retransmission units and the channels by which access to each retransmission unit may be achieved; means to learn and establish in the memory means, at the time of entry of the retransmission unit into the system, the address of each of the other retransmission units and the identity of all retransmission communication channels; means connected to the control means to select in turn each retransmission channel and to initiate the transmission thereover of successive interrogation messages to the address of each retransmission unit; and means responsive to the receipt of a reply to an interrogation message to store in the memory means an indication of the accessibility of a retransmission unit over a particular channel.

20. The system of claim 19 including: means responsive to a message from another retransmission unit to return to the calling retransmission unit an indication of the identity of those retransmission units accessible to the called retransmission unit; means responsive to the receipt of such an indication to compare the received information with that stored in the memory means; and means responsive to non-correspondence of the information in the memory with that received, to modify the information in the memory.

21. A communication system including a number of mobile basic communication units and a number of retransmission units, each basic communication unit being in communication with one of the retransmission units, and each of the retransmission units having access to at least one other retransmission unit, the retransmission units comprising: supervisory receiver means for accepting requests for range extension service from a calling basic communication unit; local message channel receivers for communication between a basic communication unit and the retransmission unit; a supervisory transmitter circuit for sending messages from the retransmission unit to the basic communication units associated therewith; a number of local message channel transmitters for communication between the retransmission unit and the associated basic communication units; local call processing means connected to the supervisory receiving and transmitting means and to the local message channel receivers and transmitters for the processing of calls between the retransmission unit and the associated basic communication units; retransmission receiver circuit means for receiving messages from another retransmission unit; retransmission transmitter circuit means for transmitting messages to another retransmission unit; coupling means for interconnecting local message channel receivers with retransmission transmitters and local message channel transmitters with retransmission receivers; a retransmission call processor connected to the retransmission receiver circuit and the retransmission transmitter circuit for controlling communication between retransmission units; and automatic sequential search control means connected to the local call processor and to the retransmission call processor for establishing communication with each of the other retransmission units in succession, one retransmission unit being contacted at a time.

22. The system of claim 21 wherein: the supervisory receiver means accepts service requests from a basic communication unit encoded on a frequency-time matrix, where the supervisory transmitter circuit transmits calling signals to a particular desired basic communication unit encoded on a frequency-time matrix; where the local message channel receivers and the local message channel transmitters provide communication between basic communication units through a number of available local message channels on an adaptive-exclusive basis; and where the retransmission receiver circuit means and the retransmission transmitter circuit means receive and transmit supervisory information between retransmission units on a frequency-time matrix, and receive and transmit message information between the retransmission units over a number of channels on an adaptive-exclusive basis.

23. The apparatus of claim 21 where the retransmission unit further includes: network memory means connected to the automatic sequential search control for storing information as to the configuration of the communication system.

24. A communication system including a number of mobile basic communication units and a number of retransmission units, comprising: local communication means providing two way communication between the retransmission unit and a number of associated basic communication units; means for receiving messages from another retransmission unit; means for transmitting messages to another retransmission unit; coupling means for interconnecting the local communication means with the receiver means and the transmitter means; a retransmission call processor connected to the receiver means and the transmitter means for controlling communication between retransmission units; and automatic sequential search control means connected to the local communication means and to the retransmission call processor for establishing communication with each of the retransmission units singly in succession.

25. The system of claim 24 wherein: the receiver means includes means to demodulate service messages received from other retransmission units, means connected to the demodulating means to decode the messages, means connecting the decoding means to the retransmission call processor, and message channel receiver means for receiving communications from other retransmission units over a number of preassigned channels; where the coupling means connecting the message channel receivers to the retransmission coupling matrix; and where the transmitter means includes means connected to the retransmission call processor to encode service messages for other retransmission units, means connected to the encoder to transmit the encoded message, message channel transmitters to communicate with other retransmission units over a number of retransmission message channels, and means connecting the message channel transmitters to the retransmission coupling matrix.

26. A communication system including a number of mobile basic communication units and a number of retransmission units, comprising: local communication means including a supervisory receiver circuit for accepting service requests from a calling basic communication unit, local message channel receivers for communication between a basic communication unit and the retransmission unit; a supervisory transmitter circuit for sending messages from the retransmission unit to the basic communication units associated therewith; a number of local message channel transmitters for communication between the retransmission units and the associated basic communication units; remote communication means providing two way communication between the retransmission unit and at least one other retransmission unit; coupling means for interconnecting the local communication means and the remote communication means to provide two way communication between a basic communication unit and another basic communication unit associated with a different retransmission unit; and automatic sequential search control means connected to the local and to the remote communication means for establishing communication with each of the other retransmission singly, in succession.

27. The system of claim 26 wherein: the supervisory receiver circuit includes a supervisory channel receiving means for receiving and demodulating the service requests from a basic communication unit; means connected to the receiver to decode the supervisory service requests; and supervisory receiver control means connecting the decoder to the local communication means for indicating the presence of a service request.

28. The system of claim 26 wherein: the local communication means includes a local call processor having means to monitor all of the local message channels; channel selector means to control the particular channel being monitored by the monitoring means; means connected to the output of the local channel monitor to sense the presence of a signal or noise on the particular channel being monitored; means connected to the signal and noise detecting means responsive to the presence of a signal or noise on the channel being monitored to signal the monitoring means to monitor a different one of the local message channels; the channel monitored being available for assignment to a call from a basic communication unit to the retransmission unit.

29. The system of claim 28 where the local call processor further includes a local supervisory control unit connected to the channel selector for receiving the identity of the channel being monitored, and connected to the supervisory receiver circuit for receiving service requests therefrom; means responsive to a service request to assign the monitored channel to the call, and to generate a message advising the calling basic communication unit of the identity of the assigned channel; and wherein the supervisory transmitter circuit includes means connected to the local supervisory control unit to encode the advisory message, and means to transmit the encoded message to the calling basic communication unit.

30. The system of claim 29 including: means in the local supervisory control unit connected to the decoder, and responsive to the address of the called basic communication unit to generate a command that the supervisory channel transmitter signal the desired basic communication unit to reply over the assigned local message channel; the decoder being further responsive to a reply from the called basic communication unit over the assigned channel to signal the local supervisory control unit that communication with the desired basic communication unit has been established; and means to generate a message for transmission by a local message channel transmitter tuned over the assigned channel to signify that communication between the calling and desired basic communication units may commence.

31. The system of claim 30 further including: means in the local supervisory control unit responsive to failure of the called basic communication unit to respond to the interrogation, to signal the automatic sequential search control unit to initiate a second interrogation by another retransmission unit.

32. The system of claim 29 where the coupling means includes: a local coupling matrix; control means responsive to signals from the local supervisory control unit, to tune and connect a local message channel receiver and a local message transmitter to the assigned communication channel; decoding means; and control means in the local coupling matrix to connect the local message channel receiver to the decoding means to receive and decode the address of the desired basic communication unit.

33. The system of claim 32 wherein: the local supervisory control unit further includes means to monitor the assigned channel for each call being processed to determine whether communication between the calling and the called basic communication units is continuing; and means responsive to the completion of a call to break the connection in the local coupling matrix between the local message channel receiver and transmitter.

34. A communication system including a number of mobile basic communication units and a number of retransmission units, the retransmission units comprising: local communication means providing two way communication between the retransmission unit and a number of associated basic communication units; remote communication means providing two way communication between the retransmission unit and at least one other retransmission unit over one or more preassigned channels; coupling means including local and retransmission coupling matrices for interconnecting the local communication means and the remote communication means; automatic sequential search control means connected to the local communication means and to the retransmission call processor for establishing communication with each of the other retransmission units singly in succession without the aid of area code information supplied by a calling user; a network memory connected to the automatic sequential search control unit to store the addresses of all the retransmission units in the system and a retransmitted call memory connected to the retransmission call processor including means for storing the identity of each of the preassigned channels and the addresses of the retransmission units accessible over each channel.

35. The system of claim 34 where the remote communication means includes a retransmission call processor having a retransmission supervisory control unit connected to the automatic sequential search control unit, to the retransmitted call memory, to the local communication means, and to the retransmission coupling matrix; encoding means connected to the retransmission supervisory control unit to encode messages generated thereby for transmission by the remote communication means; means connecting the encoding means to the retransmission coupling matrix; decoding means further connected to the retransmission coupling matrix to decode messages received by the remote communication means from other retransmission units; and means connecting the decoding means to the retransmission supervisory control unit.

36. The system of claim 35 wherein the retransmission supervisory control unit includes means responsive to a signal from the automatic sequential search control unit to generate a message requesting that a retransmission unit indicated to be accessible by the retransmitted call memory initiate an interrogation directed to the desired basic communication unit; means responsive to a message received by the remote communication means to signal the retransmission coupling matrix to interconnect the remote coupling means to the encoding means and to the decoding means; means responsive to a signal from a local communication means to generate a message identifying a desired basic communication unit for processing by the encoding means; means connected to the decoding means responsive to a message from the called retransmission unit that the basic communication unit is available to so signal the local communication means and to interconnect the local and remote communication means by suitable interconnections of the local and retransmission coupling matrices; and means responsive to the completion of the call to break the connections through the local and retransmission coupling matrices.

37. A communication system including a number of basic communication units and a number of retransmission units, the retransmission unit comprising: local communication means providing two way communication between the retransmission unit and a number of associated basic communication units; remote communication means providing two way communication between the retransmission unit and at least one other retransmission unit; means responsive to a request from a calling basic communication unit to cause the originating retransmission unit to generate a signal representing the address of a desired basic communication unit; memory means associated with the remote communication means; control means to select from the memory means the address of a first accessible retransmission unit and to transmit to the selected address an interrogation message comprising the address of the desired basic communication unit; means at each retransmission unit to search for the transmitted address and to return to the calling retransmission unit an indication of the availability of the desired basic communication unit; and means responsive to the failure of the called retransmission unit to indicate the availability of the desired basic communication unit thereat, to cause the remote communication means to select from the memory means, the address of each remaining accessible retransmission unit, and to transmit the interrogation message to each retransmission unit in succession until a reply indicating the availability of the desired basic communication unit is received, or until all the accessible retransmission units have been contacted.

38. The system of claim 37 further including: means responsive to the failure of all of the accessible retransmission units to contact the desired basic communication unit, to transmit to one of the accessible retransmission units, a request that it relay an interrogation message to a retransmission unit accessible to it; and means responsive to the failure of the retransmission unit contacted by the relaying retransmission unit to reach the desired basic communication unit, to the relaying retransmission unit to relay in turn an interrogation message to each of the other accessible retransmission units until the desired basic communication unit if found or until all of the retransmission units accessible to the relaying retransmission unit have been exhausted; and further responsive to the failure of the first relaying retransmission unit to contact the desired basic communication unit, to successively select each of the retransmission units indicated to be accessible by the memory means to serve as relaying retransmission units and to establish communication therewith to control interrogation at each of the retransmission units accessible to the relaying retransmission units in turn until the desired basic communication unit has been reached or until all of the retransmission units in the system have been exhausted.

39. A communication system including a number of mobile basic communication units, and a number of retransmission units, each basic unit being in communication with one of the retransmission units when requiring range extension, and each retransmission unit having access to at least one other retransmission unit, each retransmission unit comprising: means responsive to a request for range extension service from a calling basic communication unit, such means including means for initiating a search for a desired other user of the communication system by generating a signal representing the address of his basic communication unit; and means for conducting first a search of the local area, and then a search of adjacent distant areas, latter search being conducted without aid of area code or directional information from the calling user, latter means including means to transmit such address signal to each accessible retransmission unit in turn.

* * * * *